United States Patent Office 3,397,250
Patented Aug. 13, 1968

3,397,250
PROCESS OF PURIFYING AND RECOVERING ISOOLEFINS
Masao Nambu, Kawasaki-shi, Japan, assignor to Nippon Oil Company, Limited, Minato-ku, Tokyo, Japan
No Drawing. Filed Apr. 26, 1965, Ser. No. 451,055
Claims priority, application Japan, May 9, 1964, 39/26,053
7 Claims. (Cl. 260—677)

ABSTRACT OF THE DISCLOSURE

A process for recovering highly pure isoolefins from a hydrocarbon mixture of olefins by catalytically reacting the mixture to an aqueous solution containing a metal halide wherein the metal is a member selected from the group consisting of Group III metals, Group IV metals, Group V metals, Group VI metals and Group VIII metals.

---

The present invention relates to a process of purifying and recovering isoolefins having high purity and high commerical value for use as intermediates in organic synthesis which comprises selectively converting an isoolefin in a plural component hydrocarbon mixture to the corresponding alcohol having the same number of carbon atoms using as the catalyst an aqueous solution of so-called Friedel-Crafts type catalyst, more particularly a halide of a metal of the Group III, IV, V, VI and VIII of the Periodic Table or such aqueous solution acidified with an inorganic or organic acid.

For separating and purifying an isoolefin from a plural component hydrocarbon mixture containing paraffin, n-olefin, isoolefin and diolefin hydrocarbons, hydration-dehydration process using a sulfuric acid of appropriate concentration is well known. However, in such process, even when using a sulfuric acid of relatively low concentration as 50% by weight as in the process for the separation of isobutylene described in Hydrocarbon Processing and Petroleum Refiner, vol. 41, No. 5, page 119 (1962), and U.S. Patent No. 3,073,874, polymerization of isobutylene and resultant coloration and contamination of the sulfuric acid layer are unavoidable in the extraction of isobutylene and the subsequent heating of the extract layer. Isobutylene may be recovered in a purity of about 97 to 99% by such process, but when isobutylene of higher purity is desired great difficulties are encountered in the extraction and in the heating steps and resort has to be made to more complicated procedures, such as precise distillation, selective adsorption, etc.

For the separation and purification of isoolefins from plural component hydrocarbon mixtures, there are also known such processes as extraction of isobutylene and isoamylene using sulfuric acid of a strength of 65% by weight [U.S. Patents Nos. 2,380,350, 2,443,245; Oil and Gas Journal, Sept. 27, 1954, page 71; Chemical and Engineering News, Nov. 14, 1960, page 31], separation of isobutylene by isomerization and precise distillation (U.S. Patent No. 2,421,229), separation of isobutylene through esterification (U.S. Patents Nos. 2,775,633, 3,026,362, 3,085,122; British Patent No. 890,760; Jap. pat. appln. publns. Nos. 14,708/1963 and 17,953/1962) and separation of 1-olefin, 2-olefin and isoolefin by first converting these olefins to alkyl boranes (Jap. pat. appln. publn. No. 17,956/1962). However, all of these processes have disadvantages either in the low purity, low recovery of the olefins, complicated procedures or high cost required for the recovery of the olefins.

Extensive studies have also been made on the hydration of isoolefins and n-olefins using such catalysts as phosphoric acid, sulfuric acid, hydrochloric acid, boric acid or a salt of such acid supported on a carrier e.g. on calcined kieselguhr, metal oxide catalysts such as tungsten oxide and zinc oxide suported on silica gel, heteropolyacid type catalysts such as silicotungstic acid or phosphotungstic acid supported on silica gel or alumina and cation-exchange resin catalysts. However, all of these processes depend on high temperature hydration reaction so that the processes are quite unfavorable from the viewpoint of chemical equilibrium in that the yield is low and the reaction rate is slow. These processes are also unsatisfactory from the formation of byproducts or from the short life of the catalysts.

Many studies have also been made and various processes have been proposed for the hydration of olefin and dehydration of the resultant alcohol using an aqueous solution of a metal salt as the catalyst, for example, hydration of isobutylene and dehydration of tertiary butanol in liquid phase under pressure at 100° C. using an aqueous solution of mercuric chloride [J. Am. Chem. Soc., vol. 63, page 3000(1941)], dehydration of isopropanol, n-butanol, isobutanol, sec-butanol and t-butanol at 200° C. to 300° C. using an aqueous solution of zinc chloride, ferric chloride, nickel chloride, lead chloride, cuprous chloride, manganese chloride, tin tetrachloride, magnesium chloride, cupric chloride or mercuric chloride [J. Am. Chem. Soc., vol. 66, page 1627 (1944)], hydration of olefins and dehydration of the resultant alcohols using an aqueous solution of zinc chloride [Liebigs Annalen der Chemie, Bd. 455, p. 227 (1927)], and hydration of ethylene, propylene, n-butene, isobutylene, etc. in liquid phase under pressure at 100° C. to 300° C. using an aqueous solution of cuprous chloride, bismuth chloride, copper sulfate, zinc chloride, cadmium chloride, etc., acidified with an inorganic acid (British Patents Nos. 324,897, 397,184, 493,884; French Patent No. 662,968; U.S. Patent No. 2,148,288). However, with any of these processes it has been impossible to effect selective hydration of an isoolefin easily at about ordinary temperature and to dehydrate the resultant alcohol at a relatively low temperature below 100° C.

According to the present invention it has now been accomplished for the first time a process for the purification and recovery of isoolefins from hydrocarbon mixtures in which those conditions which have been impossible to use in the prior processes can be used satisfactorily.

Thus, according to the present invention the hydration reaction may advantageously be carried out at about ordinary temperature by catalytically reacting a hydrocarbon mixture containing an isoolefin in contact with an aqueous solution of a halide of a metal of the Group III, IV, V, VI and VIII of the Periodic Table, or such aqueous solution acidified with an inorganic or organic acid, to convert selectively the isoolefin to the corresponding tertiary alcohol. Tertiary alcohol thus formed may be reconverted to the isoolefin by heating the resultant tertiary alcohol solution and the isoolefin may be recovered in pure state. The process of the present invention is characterized in that an isoolefin having a purity as high as above 99% can be recovered in much easier manner as compared with the prior processes. The process of the present invention has great advantages in that the hydration reaction proceeds at higher rate at low temperatures so that the catalyst solution does not become contaminated during the operation and can be used repeatedly.

According to the present invention selective hydration of an isoolefin such as isobutylene, isoamylene can be carried out at about ordinary temperature and the isoolefin can be reproduced easily and quantitatively by heating the resultant tertiary alcohol, tertiary butanol, tertiary amylalcohol, respectively, in contact with the aqueous catalyst solution at a temperature below 100° C.

According to the present invention the selective hydration of isoolefin and the dehydration of tertiary alcohol are effected by the use of an aqueous solution of so-called Friedel-Crafts type catalyst such as fluoride, chloride, bromide or iodide of a metal of the Group III, IV, V, VI and VIII of the Periodic Table or an aqueous solution consisting of such aqueous solution acidified by the addition of an inorganic acid such as phosphoric acid, hydrogen fluoride, hydrogen chloride, hydrogen bromine or hydrogen iodide. The aqueous solution of Friedel-Crafts type catalyst may also be used with an organic acid such as acetic acid, trichloroacetic acid. Further the reaction may be carried out using an inert solvent such as benzene, toluene, dioxane and like.

Hydrocarbon mixtures containing isoolefins such as isobutylene, isoamylene, isohexene, etc. may be used as the feed material for the process of the present invention. For example, an isoolefin such as isobutylene or isoamylene may be recovered in pure state from a mixture with methane, ethane, ethylene, propane, propylene, butene-1, trans-butene-2, cis-butene-2, butadiene, n-butane, isobutane, n-pentane, n-pentene, cyclopentane, cyclopentene, etc. One of the important features of the process of the present invention is that the hydration reaction can be carried out at a low temperature ranging from 0° C. to 65° C. Regeneration of isoolefin by the dehydration of tertiary alcohol produced by the hydration reaction may be effected at a temperature below 150° C.

In the hydration reaction of the present invention, it is important to bring the isoolefin into intimate contact with the catalyst solution. For this purpose an inert solvent or a surface active agent or surface active solid may be used.

After the completion of the hydration reaction catalyst solution containing the tertiary alcohol formed by the hydration may be separated by removing the unreacted hydrocarbons. The tertiary alcohol may be reconverted to isoolefin and the isoolefin may be recovered in pure state and in quantitative yield by simply heating or by agitating and heating or by heating the catalyst solution containing the tertiary alcohol in a suitable manner in the presence of an inert water-insoluble solvent.

Contrary to catalysts which have conventionally been used for the hydration of olefin and dehydration of alcohol, catalyst solution used in the process of the present invention has no disadvantage of becoming contaminated to significant extent by side reactions.

For better understanding of the present invention and advantages thereof examples will be set forth below. However, it will be understood that these examples are merely for the purpose of illustration and are not to be construed as limiting the scope of the present invention.

Example I

Into a hydration vessel made of Hastelloy B and containing 1300 ml. of an aqueous solution consisting of stannous chloride 7 mol percent, hydrogen chloride 7 mol percent and water 86 mol percent 1000 ml of $C_4$ hydrocarbon mixture having the composition of isobutylene 44.8%, butadiene 20.2%, butene-1 6.3%, trans-butene-2 5.1%, cis-butene-2 4.6%, n-butane, 14.0% and isobutane 5% was introduced in liquid state. The mixture was maintained in liquid phase and agitated at 25° C. for 4 hours. Then the pressure of the reaction system was lowered to atmospheric pressure and unreacted hydrocarbons were released from the reactor. Concentration of isobutylene in the unreacted $C_4$ hydrocarbon mixture was found to have been reduced to 4% and it was confirmed that 95% of isobutylene originally present in the hydrocarbon mixture have been absorbed in the catalyst solution as tertiary butanol.

The catalyst solution was then heated to 110° C. under ordinary pressure and gas liberated was washed with warm water and collected. An amount of isobutylene corresponding to 85% of the theoretical recovery was collected and by continuing the heating for additional 1 hour isobutylene was collected in a total amount corresponding to 99% of the theoretical recovery. Isobutylene thus obtained was of extremely high grade and had a purity of 99.8%. Impurities present in the isobutylene were butene-1 200 p.p.m., butene-2 800 p.p.m., butadiene 800 p.p.m. and butane 200 p.p.m.

Example II

Into a hydration vessel made of Hastelloy B and containing 1300 ml. of an aqueous solution consisting of bismuth trichloride 5 mol percent, hydrogen chloride 8 mol percent and water 87 mol percent 2000 ml. of a hydrocarbon mixture having the composition of isobutylene 20.2%, propylene 20.0%, butadiene 5.3%, butene-1 6.3%, trans-butene-2 7.5%, cis-butene-2 3.3%, n-butane 20.3%, isobutane 7%, propane 4.1%, pentene-1 4.0% and pentene-2 2.0% was introduced in liquid state. The mixture was maintained in liquid phase and agitated at 25° C. for 1 hour.

Unreacted hydrocarbons were then released from the reactor and it was found that 89% of isobutylene originally present in the hydrocarbon mixture have been absorbed in the catalyst soltuion as tertiary butanol. Catalyst solution thus separated was then heated to 85° C. to 100° C. in the same manner as described in Example I. Isobutylene was recovered and collected in an amount approximating the theoretical recovery.

Isobutylene recovered in this example had a purity of 99.8% and the contents of impurities were butene-1 220 p.p.m., butene-2 800 p.p.m., butadiene 200 p.p.m., butane 200 p.p.m., propylene 200 p.p.m., propane 80 p.p.m. and pentene 300 p.p.m.

Example III

Into a hydration vessel of Hastelloy B containing 1300 ml. of an aqueous solution consisting of antimony trichloride 12 mol percent, hydrogen chloride 6 mol percent and water 82 mol percent 2000 ml. of hydrocarbon mixture having the composition of isobutylene 40.8%, propylene 20.0%, butadiene 5.3%, butene-1 6.3%, trans-butene-2 7.5%, cis-butene-2 7.3%, n-butane, 12.3%, isbutane 0.3% and propane 0.2% was introduced in liquid state and the mixture was agitated at 50° C. for 1 hour. Only isobutylene was selectively absorbed in the catalyst solution and the conversion of isobutylene to tertiary alcohol was 90%. The catalyst solution was separated and heated in the similar manner as described in Example I and isobutylene having a purity of 99.8% was collected in an amount corresponding to 95% of the theoretical recovery.

Example IV

Into a pressure-proof glass vessel containing 70 ml. of an aqueous solution consisting of antimony trichloride 14 mol percent, hydrogen chloride 6 mol percent and water 80 mol percent 50 ml. of a hydrocarbon mixture having the composition of isoamylene 23.4%, pentene-1 30.5%, pentene-2 32.0%, 3-methylbutene-1 4.3%, isopentane 8.8% and isoprene 1.0% was introduced and the mixture was agitated at 27° C. for 6 hours. Unreacted hydrocarbons were then removed and 8.8 grams of tertiary amylalcohol were obtained. The tertiary amylalcohol and the catalyst solution were heated together to 85° C. to 120° C. while agitating the two layers. 7 grams of isoamylene having a purity of 99.7% were collected.

Having now particularly described my invention, what I claim and desire to secure by Letters Patent is:

1. A process for the production of tertiary butanol from a hydrocarbon material containing a mixture of isomeric butylenes comprising contacting said hydrocarbon material at a temperature of from about 0° to 65° C. with an acidic aqueous solution of a halide selected from the group consisting of stannous chloride, bismuth trichloride, and antimony trichloride to selectively convert the isobutylene in said mixture to tertiary butanol.

2. A process for the production of tertiary amyl alcohol from a hydrocarbon material containing a mixture of isomeric amylenes which comprises contacting said hydrocarbon material with an acidic aqueous solution of a halide selected from the group consisting of stannous chloride, bismuth trichloride, and antimony trichloride, at a temperature of from about 0° to 65° C. to selectively convert the isoamylene in said mixture to tertiary amylalcohol.

3. A process for recovering isoolefins in pure form from a hydrocarbon mixture of olefins wherein said mixture contains isoolefins comprising catalytically reacting at temperatures of from 0° C. to 65° C. said mixture with an acidic aqueous solution containing a metal chloride wherein said metal is selected from the group consisting of stannous chloride, bismuth trichloride and antimony trichloride to selectively hydrate the isoolefins to the corresponding alcohol, separating said solution containing said alcohol from said hydrocarbon mixture and dehydrating said separated alcohol to form isoolefin in pure form.

4. A process for recovering highly pure isobutylene from a hydrocarbon material consisting of isomeric mixture of butylenes, comprising catalytically reacting at temperatures of from 0° C. to 65° C. said hydrocarbon material with an acidic aqueous solution containing a chloride selected from the group consisting of stannous chloride, bismuth trichloride, and antimony trichloride to selectively hydrate the isobutylene to tertiary butanol, expelling the unreacted hydrocarbons from said solution containing said tertiary butanol, dehydrating said tertiary butanol to isobutylene by heating said solution to a temperature of not higher than 150° C. and recovering said isobutylene in pure form.

5. A process for recovering highly pure isoamylene from a hydrocarbon material consisting of an isomeric mixture of amylenes, comprising catalytically reacting at temperatures of from 0° C. to 65° C. said hydrocarbon material with an acidic aqueous solution containing a chloride selected from the group consisting of stannous chloride, bismuth trichloride, and antimony trichloride to selectively hydrate the isoamylene to tertiary amyl alcohol, expelling the unreacted hydrocarbons from said solution containing said tertiary amyl alcohol, dehydrating said tertiary amyl alcohol to isoamylene by heating said solution to a temperature of not higher than 150° C. and recovering said isoamylene in pure form.

6. A process for the production of a tertiary alcohol from a hydrocarbon mixture containing olefins in various isomeric forms, comprising contacting said hydrocarbon mixture at a temperature of from about 0° C. to 65° C. with an acidic aqueous solution of a metal chloride wherein said metal chloride is selected from the group consisting of stannous chloride, bismuth trichloride, and antimony trichloride to selectively hydrate the isoolefins in said mixture to the corresponding tertiary alcohols.

7. The process of claim 3 wherein said alcohol is dehydrated by heating the alcohol to a temperature of not greater than 150° C.

References Cited
UNITED STATES PATENTS
2,107,515   3/1938   Bent    260—156
2,156,070   4/1939   Stern    260—663

DELBERT E. GANTZ, *Primary Examiner.*

J. D. MYERS, *Assistant Examiner.*